United States Patent [19]

Bainard

[11] 4,126,317
[45] Nov. 21, 1978

[54] SEAL FOR INSTALLING SEAL OVER SPLINED SHAFT

[75] Inventor: Dean R. Bainard, Clover, S.C.

[73] Assignee: Garlock Inc., Rochester, N.Y.

[21] Appl. No.: 689,038

[22] Filed: May 24, 1976

[51] Int. Cl.² .............................................. F16J 15/34
[52] U.S. Cl. ...................................... 277/9.5; 277/152
[58] Field of Search .................. 277/1, 152, 158, 189, 277/9, 9.5, 10, 11

[56] References Cited

U.S. PATENT DOCUMENTS

| | | | |
|---|---|---|---|
| 2,181,203 | 11/1939 | Reynolds | 277/208 |
| 3,235,271 | 2/1966 | Johnson et al. | 277/47 |
| 3,346,265 | 10/1967 | Rhoads et al. | 277/152 |
| 3,545,770 | 12/1970 | Wheelock | 277/152 |
| 3,825,271 | 7/1974 | Bellastio | 277/152 |
| 3,831,104 | 5/1974 | Smith | 277/94 |
| 3,947,944 | 4/1976 | Washington | 277/9.5 |

Primary Examiner—Robert I. Smith
Attorney, Agent, or Firm—Schovee & Boston

[57] ABSTRACT

A seal and a method for installing a seal over a first portion of a shaft (such as a larger diameter splined portion) and for sealing against a second portion of the shaft, in which, during installation, the sealing lip is moved to a non-sealing configuration out of contact with the first portion of the shaft.

30 Claims, 7 Drawing Figures

SEAL FOR INSTALLING SEAL OVER SPLINED SHAFT

BACKGROUND OF THE INVENTION

1. Field of the Invention

This invention relates to seals and to the installation of seals onto a shaft.

2. Description of the Prior Art

In the art of sealing the spline area of truck prop. shafts, prior art designs have used a cork or felt split gasket compressed into a screw-on cap. This prior art technique is expensive, creates an assembly problem, and is ineffective in excluding contaminants. Elastomeric seals have not been used previously in this application because the seal must first pass over a spline which is approximately 0.4 inch larger in diameter than the surface upon which the sealing lip rides. The other end of such a shaft has a yoke with an O.D. larger than that of the splined portion of the shaft, as will be understood by those skilled in the art. Other seal applications such as the power take-off on agricultural equipment present similar problems.

It is an object of the present invention to overcome such problems in the prior art and to provide relatively inexpensive, easy to install seals which positively exclude contaminants.

SUMMARY OF THE INVENTION

The seal according to one preferred embodiment of the present invention is a molded elastomeric seal having an annular mounting portion, a sealing lip portion, and an elongated portion connecting the mounting and sealing lip portions. During installation of the seal on a shaft having a first portion that can damage the sealing lip and a second portion on which the sealing lip is to ride, the sealing lip portion is reversed, that is, it is folded under the mounting portion, such that the O.D. surface of the sealing lip portion rides on the first portion of the shaft maintaining the sealing lip out of contact with the shaft to protect it from damage. After the shaft has been inserted through the seal, the sealing lip portion is returned to its normal, sealing configuration in contact with the second portion of the shaft. In other embodiments, the sealing lip portion is moved to a non-sealing configuration during installation over the first shaft portion such as being reversed as mentioned above or by being folded up and locked on top of the mounting portion.

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION OF THE PREFERRED EMBODIMENT

Figure 1:
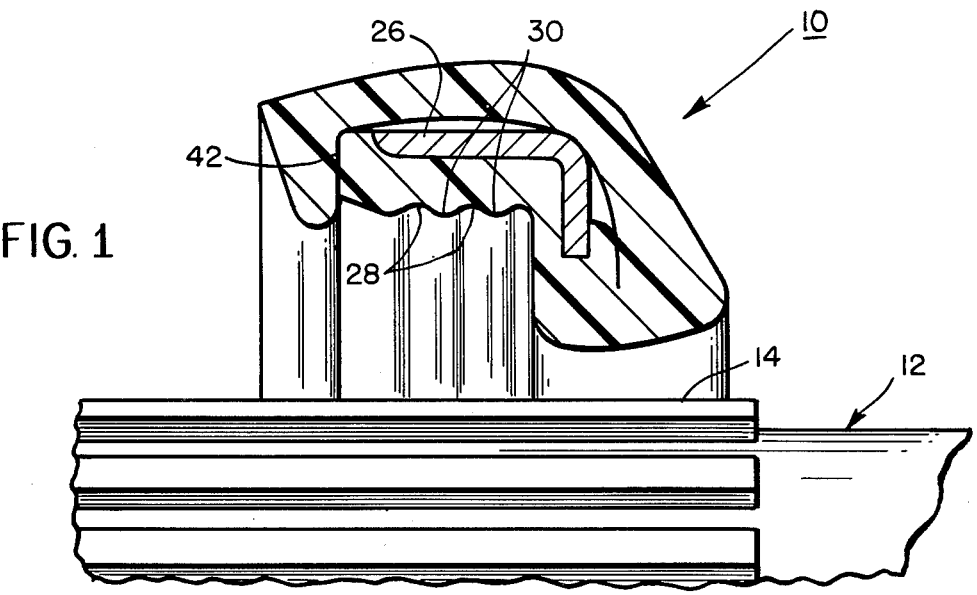
FIGS. 1-3 are each a partial cross-sectional view through a seal of the present invention, with FIGS. 1 and 3 illustrating two different embodiments of the invention.
Figure 2:
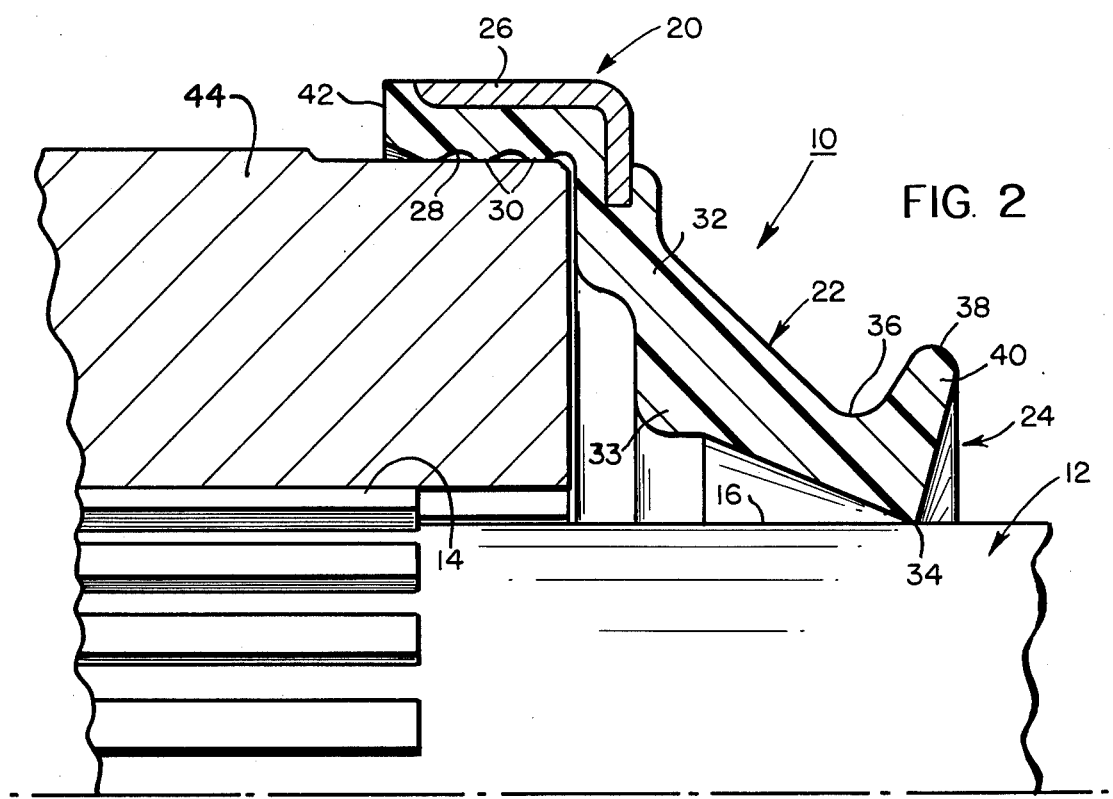
Figure 3:
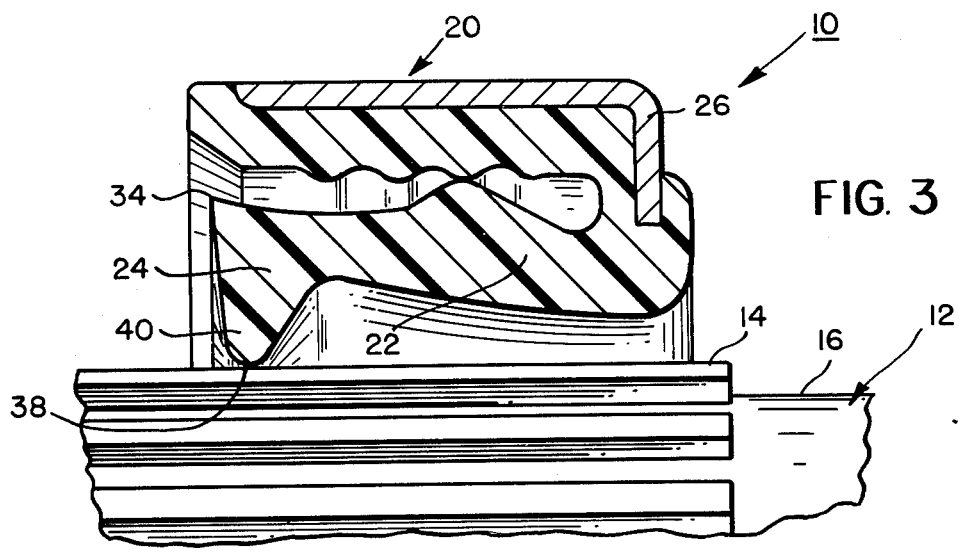

With reference not to the drawings, FIGS. 1-3 show a seal 10 according to the present invention for installation on a shaft 12 having a first splined portion 14 and a second, smooth portion 16. The splined portion 14 has an O.D. approximately 0.4 inch greater than the O.D. of the smooth portion 16. FIG. 3 shows the seal 10 in its preferred non-sealing configuration as it is being installed over the splined portion 14 (moved to the right in the FIGS. relative to the shaft 12). FIG. 1 shows the seal 10 in another non-sealing configuration during installation, and FIG. 2 shows the seal 10 in its normal, sealing configuration on the smooth portion 16 of the shaft 12.

The seal 10 is preferably molded from an elastomeric material and includes a mounting portion 20, an elongated (preferably a hollow frusto-conical or tapered) portion 22 and a sealing lip portion 24. The mounting portion preferably includes an annular metal shell 26 on the O.D. thereof. The I.D. of the mounting portion preferably includes a plurality of annular grooves and ridges 28 and 30, respectively. The elongated portion 22 includes an intermediate, relatively short length portion 32 of reduced thickness smaller than that of the adjacent sections of the elongated portion 22, and an annular, radially inwardly extending enlargement 33, for a purpose to be explained below. The sealing lip portion 24 includes a sealing lip 34 and an annular groove 36 on the O.D. surface thereof.

FIG. 3 shows the preferred embodiment of the present invention wherein the sealing lip portion 24 is moved to a non-sealing configuration by being reversed from its normal sealing position shown in FIG. 2. That is, it is folded under and extends from the mounting portion 20 in the opposite direction from that when the sealing lip portion is in its normal sealing configuration. In the non-sealing configuration shown in FIG. 3, the sealing lip 34 is held away from and out of contact with the first, splined portion 14 of the shaft 12 to protect the sealing lip 34 from damage during installation. During installation over the first portion 14, the O.D. surface 38 of an enlargement 40 on the O.D. of the sealing lip portion 24 rides directly on the surface of the first, splined portion 14 of the shaft 12. After the seal 10 has passed over the first, splined portion 14 of the shaft, the sealing lip portion 24 is then moved back from its reversed position shown in FIG. 3 to its normal sealing configuration shown in FIG. 2. The mounting portion 20 is then attached to a housing 44 as shown in FIG. 2.

FIG. 1 shows another non-sealing configuration. In this embodiment the sealing lip portion 24 is slightly stretched and is folded up on top of, and is locked onto the distal end 42 of the mounting portion 20 with the distal end 42 being received within the groove 36 of the sealing lip portion, during installation. After the first splined portion 14 of the shaft 12 has been inserted through the seal 10 (or the seal moved over the first splined portion), the sealing lip portion 24 is then unlocked from the folded, non-sealing configuration and returned to the normal, sealing configuration shown in FIG. 2. The seal 10 is then press-fitted onto the O.D. of a housing 44 (such as the yoke of the adjacent prop. shaft) as shown.

In the embodiment of FIGS. 1-3 the housing 44, the seal 10 and the shaft 12 rotate together, however, the seal 10 and the method of installation of this invention can alternatively be used in applications where the housing 44 and the seal 10 rotate relative to the shaft 12 (that is, the housing 44 and seal 10 are stationary and the shaft 12 rotates or vice versa). The annular enlargement 33 is an increased mass of elastomeric material that helps to hold the sealing lip 34 on the shaft 12 during rotation and by being located approximately radially in-line with the portion 32 of reduced thickness the centrifugal force on the enlargement 33 during rotation of the seal 10 will not tend to lift the sealing lip portion 24 off of the shaft 12.

Figure 4:
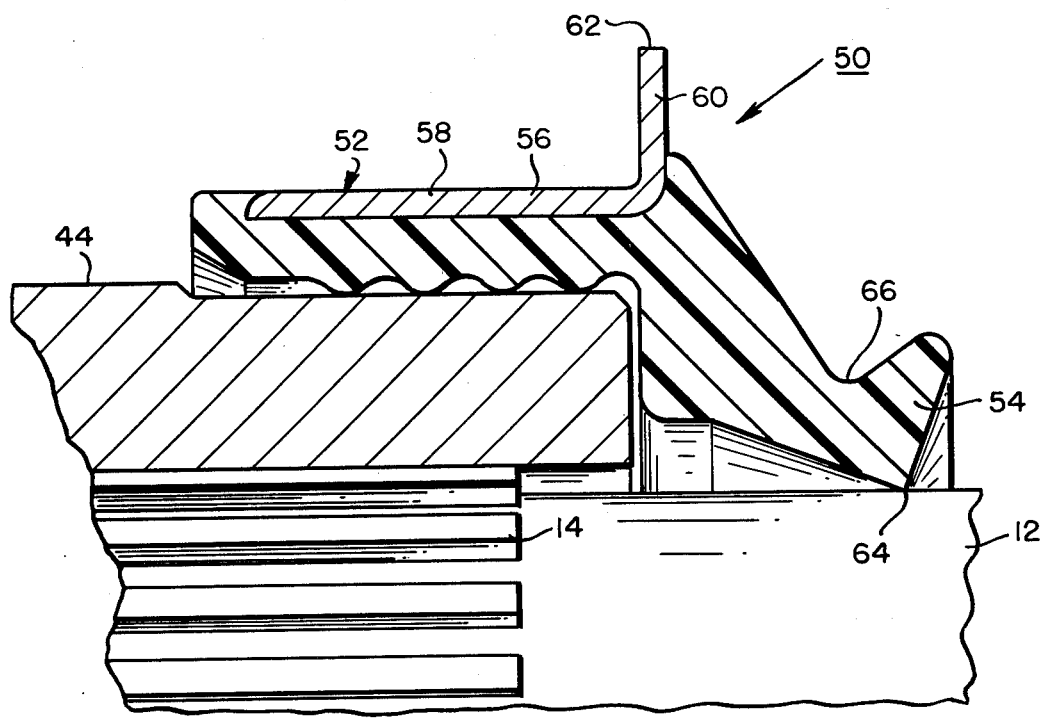
FIGS. 4 and 5 are each a partial cross-sectional view through another seal of the present invention.
Figure 5:
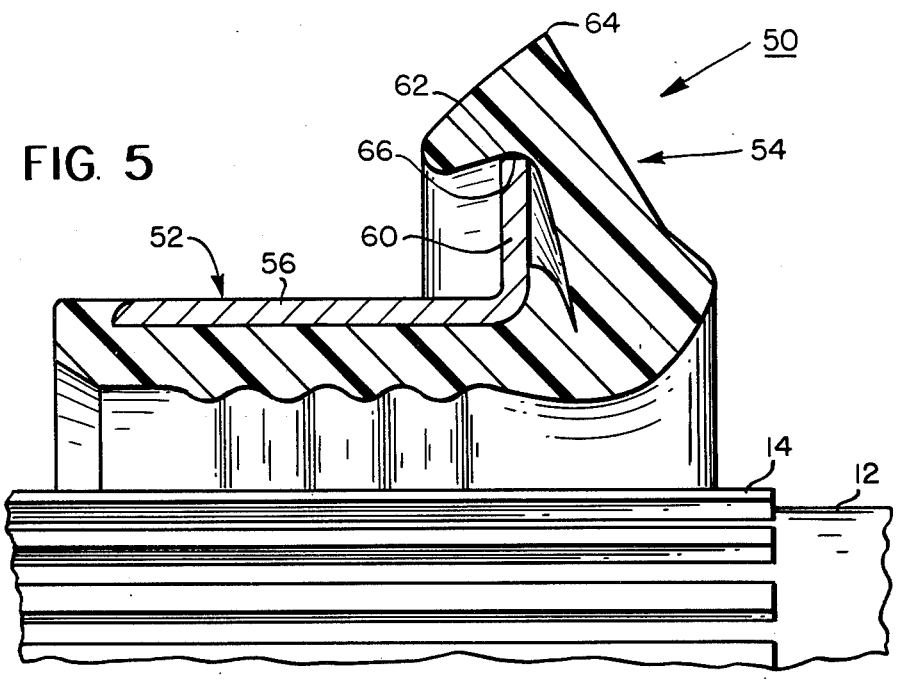

Referring now to the embodiment of FIGS. 4 and 5, this embodiment comprises a seal 50 which is similar to the seal 10 of FIGS. 1-3 except that it does not include the same elongated portion 22 and it is thus useful in narrow cross-section applications. The seal 50 includes a mounting portion 52 and a sealing lip portion 54. The mounting portion includes a metal reinforcing shell 56 having a cylindrical portion 58 and a radially outwardly extending member 60 having a distal end 62. The sealing lip portion 54 includes a sealing lip 64 and a groove 66 on the O.D. surface thereof. The normal sealing configuration of the seal 50 is shown in FIG. 4. FIG. 5 shows a non-sealing configuration of the seal 50 with the sealing lip portion 54 stretched and folded up on top of the mounting portion 52 and locked thereto with the radially outwardly extending member 60 engaged in the groove 66. The operation of the seal of this embodiment of the present invention is similar to that of the seal as shown in FIGS. 1-3.

Figure 6:
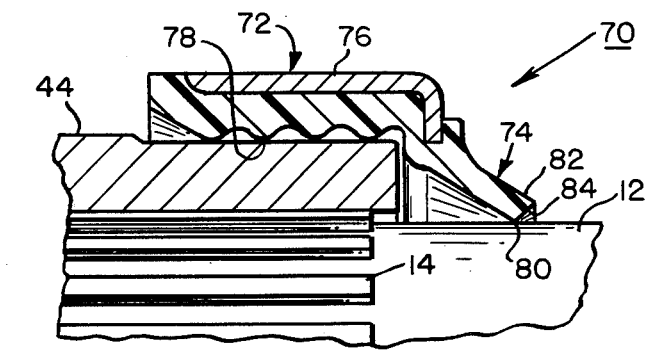
FIGS. 6 and 7 are each a cross-sectional view through yet another seal of the present invention.
Figure 7:
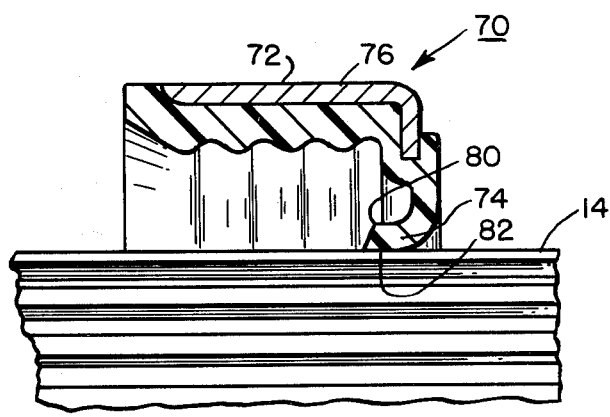

FIGS. 6 and 7 show another embodiment of the present invention of a seal 70 comprising a mounting portion 72 and a sealing lip portion 74. The mounting portion 72 includes a metal reinforcing shell 76 and a plurality of grooves and ridges on the I.D. surface 78 thereof. The sealing lip portion 74 includes a sealing lip 80 and an O.D. surface 82. The seal 70 is shown in its normal sealing configuration in FIG. 6 and FIG. 7 shows the sealing lip portion in its reversed, non-sealing configuration during installation on the first, splined portion 14 of the shaft 12. In this non-sealing configuration, the sealing lip 80 is held away from and out of contact with the surface of the shaft portion 14 to protect it from damage, by having the O.D. surface 82 of the sealing lip portion 74 ride directly on and in contact with the surface of the first splined portion 14 of the shaft 12. After the seal 70 has passed over the first splined portion 14 of the shaft 12 and is over the second portion 16, the reversed or non-sealing configuration shown in FIG. 7 is changed by moving or folding (for example, by moving the seal 70 to the left with respect to the shaft 12) the sealing lip portion 74 to its normal sealing configuration shown in FIG. 6. The mounting portion 72 is then attached to a housing 44. The end wall 84 of the sealing lip portion 74 is not necessarily perpendicular to the length of the sealing lip portion but may be at an angle thereto as shown in FIG. 6.

The seals of the present invention are relatively inexpensive, are easy to install, and positively exclude contaminants from the application. By moving the sealing lip out of contact with the first portion 14 during installation, damage to the sealing lip is minimized or eliminated.

While the various seal embodiments and applications including the preferred embodiment and application, have been described above, other seal structures and methods and other seal applications can be used. For example, the seal and method can be used in other applications than with truck prop. shafts and slip joint prop. shafts, such as in the power take off of agricultural equipment and in any application where the seal must pass over a first portion of a shaft that could damage the sealing lip. The first portion need not be of larger diameter and need not be a splined shaft. Other ways of moving the sealing lip portion away from the first portion of the shaft can be used. The metal reinforcing shell is not essential. The press-fit surface of the mounting portion of the seal can be on the O.D. surface thereof instead of on the I.D. as shown and other ways of attaching the mounting portion to a housing can be used. The slight stretching required of the seal in certain of the embodiments described above is not so great as to require any unusual degree of elasticity in the elastomer; that is, standard elastomeric materials can be used. Further, other materials than elastomers, such as leather and PTFE can be used in certain embodiments. The term "tapered" as used herein means generally tapered, and includes a stepped construction as well as a smoothly tapered elongated portion. In all of the above embodiments, the sealing lip portion is movable to a non-sealing configuration in which the sealing lip is out of contact with the shaft and the seal includes means for holding the sealing lip out of contact with the shaft in the non-sealing configuration. Such means include, for example, the means for locking the sealing lip portion up on top of the mounting portion as shown in FIGS. 1 and 5, and the means such as the O.D. surfaces 38 and 82 in FIGS. 3 and 7.

The invention has been described in detail with particular reference to the preferred embodiments thereof, but it will be understood that variations and modifications can be effected within the spirit and scope of the invention as described hereinabove and as defined in the appended claims.

I claim:

1. An annular shaft seal to be moved over a first, larger diameter portion of a shaft and to seal against a second, smaller diameter portion of said shaft, comprising a mounting portion and a sealing lip portion having a sealing lip, said sealing lip portion being movable, with respect to said mounting portion, from a sealing configuration in which said sealing lip has the smallest diameter of all portions of said seal and is adapted to be in contact with said second portion of said shaft, to a non-sealing configuration in which the diameter of said sealing lip is greater than that of at least one other portion of said seal, and in which said at least one other portion of said seal is located directly radially inwardly of said sealing lip and between the sealing lip and the shaft, such that said sealing lip cannot contact either portion of said shaft when said seal is being installed on said shaft, whereby said sealing lip can be located out of contact with said first portion of said shaft during installation, and said sealing lip portion also being movable with respect to said mounting portion, from said non-sealing configuration back to said sealing configuration, whereby said sealing lip can be moved into sealing contact with said second portion of said shaft after said seal has been moved over and beyond said first portion of said shaft to said second portion of said shaft.

2. The seal according to claim 1 wherein said seal includes means for holding said sealing lip out of contact with a shaft during installation.

3. The seal according to claim 2 wherein said seal is made of elastomeric material and said holding means includes means for stretching said sealing lip to a larger diameter than its normal sealing diameter.

4. The seal according to claim 1 including an annular elongated portion extending between and connecting together said mounting portion and said sealing lip portion, said elongated portion being flexible whereby said sealing lip portion can be moved to said non-sealing configuration.

5. An annular shaft seal to be moved over a first, larger diameter portion of a shaft and to seal against a second, smaller diameter portion of a shaft, comprising a mounting portion and a sealing lip portion having a sealing lip, said sealing lip portion being movable, with respect to said mounting portion, from a sealing configuration in which said sealing lip has the smallest diameter of all portions of said seal and is adapted to be in contact with said second portion of said shaft, to a non-sealing configuration in which the diameter of said sealing lip is greater than that of at least one other portion of said seal such that said sealing lip cannot contact either portion of said shaft when said seal is being installed on said shaft, whereby said sealing lip can be located out of contact with said first portion of said shaft during installation, and said sealing lip portion also being movable with respect to said mounting portion, from said non-sealing configuration back to said sealing configuration, whereby said sealing lip can be moved into sealing contact with said second portion of said shaft after said seal has been moved over and beyond said first portion of said shaft to said second portion of said shaft, said shaft seal including an annular elongated portion extending between and connecting together said mounting portion and said sealing lip portion, said elongated portion being flexible whereby said sealing lip portion can be moved to said non-sealing configuration, and wherein said elongated portion has a length and flexibility and said sealing lip portion has an elasticity, such that said sealing lip portion can be stretched and folded up over the top of said mounting portion and means for locking said sealing lip portion to said mounting portion.

6. The seal according to claim 5 wherein said locking means comprises means for locking said sealing lip portion on a proximal end of said mounting portion.

7. The seal according to claim 6 wherein said sealing lip portion includes an annular groove on the O.D. surface thereof and wherein said locking means includes means for locking said groove onto the proximal end of said mounting portion.

8. The seal according to claim 7 wherein the proximal end of said mounting portion of said seal includes a radially outwardly extending member.

9. The seal according to claim 5 wherein said locking means comprises means for locking said sealing lip portion to the distal end of said mounting portion.

10. The seal according to claim 9 wherein said sealing lip portion includes an annular groove on the O.D. surface thereof and wherein said locking means includes means for locking said groove onto the distal end of said mounting portion.

11. The seal according to claim 5 wherein said elongated portion tapers from a larger diameter adjacent said mounting portion to a smaller diameter adjacent said sealing lip portion.

12. The seal according to claim 5 wherein said mounting portion includes an annular metal reinforcing shell.

13. The seal according to claim 5 wherein said mounting portion includes a plurality of annular grooves and ridges on a press-fit surface thereof.

14. The seal according to claim 5 wherein said elongated portion includes a relatively short length portion of reduced thickness less than the thickness of the adjacent sections of said elongated portion.

15. The seal according to claim 14 wherein said short length portion is approximately half-way between said distal end of said reinforcing portion and said sealing lip portion.

16. The seal according to claim 14 wherein said elongated portion includes a radially inwardly extending enlargement the center of mass of which is approximately radially in-line with said relatively short length portion of reduced thickness.

17. The seal according to claim 2 wherein said holding means comprises an O.D. surface of said sealing lip portion.

18. The seal according to claim 1 wherein said sealing lip portion extends axially away from said mounting portion in one direction when in said sealing configuration and in the opposite direction when in said non-sealing configuration.

19. The seal according to claim 1 wherein said sealing lip in said non-sealing configuration has a diameter a predetermined amount greater than the diameter of said sealing lip when said sealing portion is in said sealing configuration.

20. The seal according to claim 1 wherein said sealing lip has a greater diameter when in said non-sealing configuration than when in said sealing configuration.

21. The seal according to claim 1 wherein said at least one other portion of said seal is adapted to contact said shaft.

22. The seal according to claim 2 wherein said holding means is said at least one other portion of said seal.

23. An annular shaft seal to be moved over a first, distal portion of a shaft, having a surface that can damage said seal, and to seal against a second portion of said shaft, said seal comprising a mounting portion, a sealing lip portion, and an annular, elongated, flexible portion extending between and connecting together said mounting portion and said sealing lip portion, said sealing lip portion having a sealing lip and being movable back and forth between a sealing configuration and a non-sealing configuration, said sealing lip in said sealing configuration having a predetermined diameter for sealing purposes and having a location such that it can contact a shaft extending through said seal, said sealing lip in said non-sealing configuration having a diameter larger than that of at least one other portion of said seal and said at least one other portion of said, seal being located directly radially inwardly of said sealing lip and between the sealing lip and the shaft when in said non-sealing configuration, such that said sealing lip cannot contact a shaft extending through said seal when said sealing lip is in said non-sealing configuration.

24. The seal according to claim 23 wherein said seal includes means for holding said sealing lip out of contact with a shaft during installation.

25. An annular shaft seal to be moved over a first, distal portion of a shaft, having a surface that can damage said seal, and to seal against a second portion of said shaft,
said seal comprising a mounting portion, a sealing lip portion, and an annular, elongated, flexible portion extending between and connecting together said mounting portion and said sealing lip portion, said sealing lip portion having a sealing lip and being movable back and forth between a sealing configuration and a non-sealing configuration, said sealing lip in said sealing configuration having a predetermined diameter for sealing purposes, and having a location such that it can contact a shaft extending through said seal, said sealing portion in said non-sealing configuration being reversed with an O.D. surface of said sealing lip portion adapted to be in sliding contact with a shaft, said sealing lip in said non-sealing configuration having a diameter larger than that of at least one other portion of said seal such that it cannot contact a shaft extending through said seal, said shaft seal including means for holding said sealing lip out of contact with a shaft during installation, and wherein said holding means comprises said O.D. surface of said sealing lip portion.

26. The seal according to claim 25 wherein said sealing lip portion includes an annular enlargement on the O.D. surface thereof opposite said sealing lip and wherein said O.D. surface is on said enlargement.

27. The seal according to claim 25 wherein said first portion has a larger diameter than said second portion of said shaft, said seal being made of elastomeric material, and said sealing lip portion extending axially away from said mounting portion in one direction when in said sealing configuration and in the opposite direction when in said non-sealing configuration.

28. An assembly comprising a housing having a bore therethrough a shaft extending through said bore and having a first larger diameter portion and a second smaller diameter portion, and an annular shaft seal connected to said housing for sealing against said second portion of said shaft, said seal being adapted to be moved over said first larger diameter portion of said shaft and to seal against said second smaller diameter portion of said shaft and comprising a mounting portion, a sealing lip portion, and an annular, elongated, flexible portion extending between and connecting together said mounting portion and said sealing lip portion, said sealing lip portion having a sealing lip and being movable, with respect to said mounting portion, from a sealing configuration in which said sealing lip is adapted to be in contact with said shaft to a non-sealing configuration in which said sealing lip is adapted to be out of contact with said shaft when said seal is being installed on said shaft, whereby said sealing lip can be located out of contact with said first portion of said shaft during installation, and said sealing lip portion also being movable with respect to said mounting portion, from said non-sealing configuration back to said sealing configuration, whereby said sealing lip can be moved into sealing contact with said second portion of said shaft after said seal has been moved over and beyond said first portion of said shaft to said second portion of said shaft, and said flexible portion extending away from said mounting portion in one axial direction when said sealing lip portion is in said sealing configuration and extending away from said mounting portion in the opposite axial direction when said sealing lip portion is in said non-sealing configuration.

29. The assembly according to claim 26 wherein there is sufficient radial space between said mounting portion and said shaft when said seal is on said shaft such that said sealing lip portion can be moved axially through said space.

30. The assembly according to claim 26 wherein said larger diameter portion of said shaft is splined to said housing bore.

* * * * *

UNITED STATES PATENT AND TRADEMARK OFFICE
CERTIFICATE OF CORRECTION

PATENT NO. : 4,126,317
DATED : Nov. 21, 1978
INVENTOR(S) : Dean R. Bainard

It is certified that error appears in the above-identified patent and that said Letters Patent are hereby corrected as shown below:

Delete title and insert therefor --SEAL FOR INSTALLATION OVER SPLINED SHAFT--.

Signed and Sealed this

Tenth Day of April 1979

[SEAL]

Attest:

RUTH C. MASON
*Attesting Officer*

DONALD W. BANNER
*Commissioner of Patents and Trademarks*